UNITED STATES PATENT OFFICE.

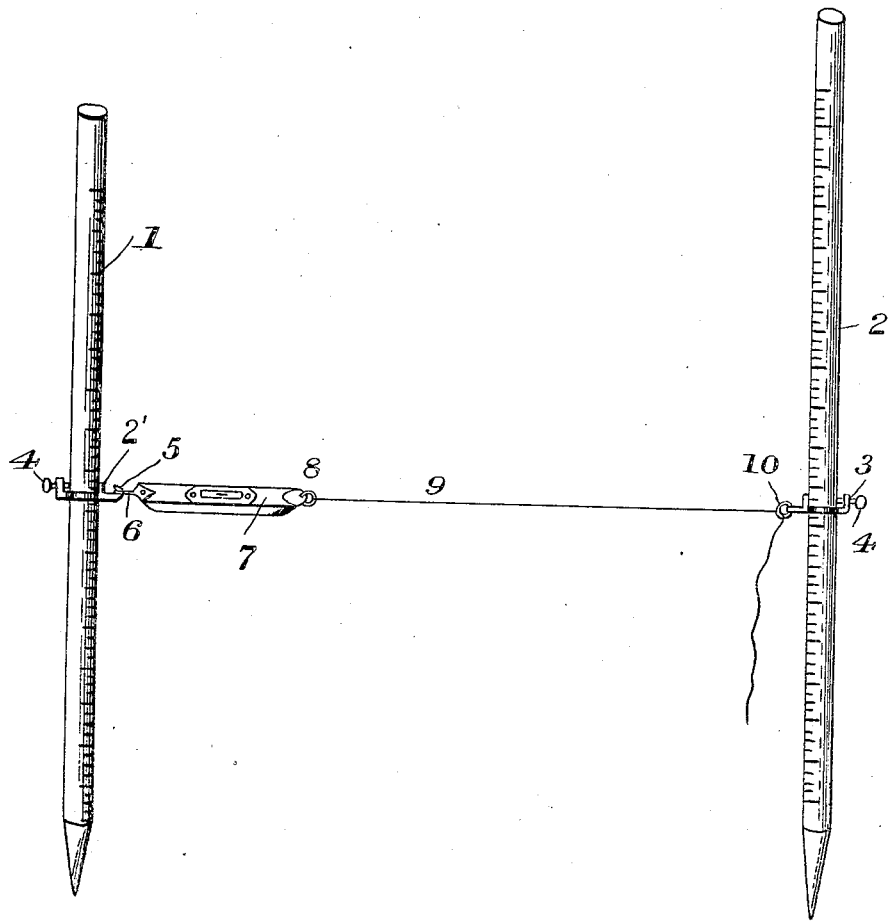

FRANK SHEPPARD, OF EL DORADO, ARKANSAS.

HOUSE-LEVELING INSTRUMENT.

No. 921,470.     Specification of Letters Patent.     Patented May 11, 1909.

Application filed May 12, 1908. Serial No. 432,354.

*To all whom it may concern:*

Be it known that I, FRANK SHEPPARD, a citizen of the United States, residing at El Dorado, in the county of Union and State of Arkansas, have invented certain new and useful Improvements in House-Leveling Instruments, of which the following is a specification.

My invention relates to new and useful improvements in house-leveling instruments, and has for its object to provide such an instrument as will be commercially cheap, of simple construction, and of easy manipulation.

Another object of my invention is to provide such an instrument as will do the work required thereof, accurately, yet quickly, its several parts being so constructed that the instrument is adapted to be adjusted to be used in any required space.

With these and other objects in view my invention consists of the novel combination and construction of the hereinafter described parts, which are illustrated in the accompanying drawings, and particularly pointed out in the claim hereunto appended.

Referring to the drawings:—the figure is a side elevation of my invention.

Referring more particularly to the drawings, the rods or staffs 1 and 2, which are pointed at their lower ends, have clamps 2' and 3, thereon respectively, which are adapted to be vertically adjusted on said rods. The rods are graduated in inches, or in fact, any unit of graduation may be employed. The said clamps 2' and 3, are adapted to be held firmly at any desired point by means of thumb-screws 4. The clamp 2', has an outwardly projecting hooked portion 5, adapted for engagement with a ring 6, connected to one end of a leveler 7. Another ring 8, is connected to the other end of said leveler, said ring 8, having a cord 9, secured thereto. Referring to the clamp 3, it has a projecting portion having passing therethrough a perforation for the purpose of receiving a ring 10. When said staffs or rods are placed a desired or required distance apart the cord or tape 9, or any other means of connection adapted for this purpose, is passed through said ring 10, and, after being drawn taut, is firmly tied.

When my instrument is in position, and the clamps are opposite gage marks of equal value, said level, should the surface upon which said rods rest be level, will register the same. Should there be a difference in level between the two resting points of said rods then either of said clamps may be adjusted so that said level will be held in a level position, then the difference in level between said points, will be the difference between the values marked opposite those particular points whereto said clamps are clamped. It is observed that the leveling instrument to which this cord, or tape, is connected, should be of some light material, preferably aluminium, to prevent, as far as possible, the sagging of the cord, or other connection used.

Though I have specifically described my invention I may claim the right to make such changes in minor details of construction thereof as will not depart from the spirit and scope of my invention.

Having described my invention, what I claim as new, and desire to secure by Letters Patent, is:—

1. In a house-leveling instrument, the combination of two rods or staffs having clamps thereon adapted to be vertically adjusted on said rods, said clamps adapted to be held at any desired points on said rods by means of thumb-screws, said clamps further adapted to support a level, said level having rings secured to either end of the same, one of said rings engaging one of said clamps, the other ring connected to the other clamp by means of a cord, substantially as shown and described and as herein set forth.

2. In a house leveling instrument, the combination of two rods or staffs having clamps thereon adapted to be vertically adjusted thereon, means to hold said clamps at any desired points on said rods, said clamps further adapted to support a level, rings secured to either end of the same, one of said rings engaging one of said clamps, means of connection between the other ring and other clamp substantially as described.

In testimony whereof I affix my signature in presence of two witnesses.

FRANK SHEPPARD.

Witnesses:
   J. R. LOVENTHAL,
   AYLMER FLENNIKEN.